United States Patent [19]

Martinengo et al.

[11] 4,241,113

[45] Dec. 23, 1980

[54] PROCESS FOR PRODUCING PROTECTIVE COATINGS ON METALS AND METAL ALLOYS FOR USE AT HIGH TEMPERATURES

[75] Inventors: Pier C. Martinengo, Turin; Carlo Carughi, Cantalupa, both of Italy

[73] Assignee: Fiat Societa per Azioni, Turin, Italy

[21] Appl. No.: 73,036

[22] Filed: Sep. 6, 1979

Related U.S. Application Data

[63] Continuation of Ser. No. 924,582, Jul. 14, 1978, abandoned.

[30] Foreign Application Priority Data

Jul. 14, 1977 [IT] Italy .............................. 68635 A/77

[51] Int. Cl.³ .............................................. C23C 9/00
[52] U.S. Cl. ................................. 427/229; 427/383.9; 428/652; 428/667
[58] Field of Search ............... 428/652, 653, 666, 667; 427/229, 253, 383 D

[56] References Cited

U.S. PATENT DOCUMENTS

| | | | |
|---|---|---|---|
| 1,655,269 | 1/1928 | Howe | 427/229 |
| 2,811,466 | 10/1957 | Samuel | 427/229 |
| 3,000,755 | 9/1961 | Hanink et al. | 427/383 D |
| 3,107,175 | 10/1963 | Cape | 427/229 |
| 3,501,338 | 3/1970 | Matzek | 427/229 |
| 3,720,537 | 3/1973 | Rigney | 427/229 |
| 3,794,511 | 2/1974 | Baranow | 427/253 |
| 4,009,146 | 2/1977 | Cork et al. | 427/229 |

*Primary Examiner*—Ralph S. Kendall
*Attorney, Agent, or Firm*—Sughrue, Rothwell, Mion, Zinn and Macpeak

[57] ABSTRACT

A process for forming a protective metal diffusion coating on a metal or metal alloy workpiece including internal cavity surfaces, comprises coating the workpiece with a slurry in acetone and cellulose acetate of a powder of average grain size of $0.5\mu$ to $10\mu$, including aluminum and possibly chromium and/or a small quantity of cerium or yttrium hydride and heating the workpiece in a non-oxidizing environment to dissociate the hydride and effect diffusion of the metals into the surface of the workpiece.

4 Claims, No Drawings

PROCESS FOR PRODUCING PROTECTIVE COATINGS ON METALS AND METAL ALLOYS FOR USE AT HIGH TEMPERATURES

This is a continuation, of application Ser. No. 924,582, filed July 14, 1978, abandoned.

BACKGROUND OF THE INVENTION

The present invention relates to a process for forming a protective coating on metals and metal alloy for use at high temperatures.

The use of diffusion coatings to protect metal parts operating at high temperatures from the destructive action of oxidation, corrosion, erosion, and thermal shock which form part of the normal operating conditions has been known for many years. Many types of such coatings have been proposed and, in fact, used and, in general, these contain aluminum as the main protective element. The life of these aluminum-based diffusion coatings depends not only on their thickness but above all on the resistance to rupture of the protective oxide layer which forms on the surface. With reference to the application of such coatings to the protection of turbine blades this resistance has become more and more critical with the continuing tendency to increase the operating temperatures of gas turbines.

The process generally used for the preparation of aluminum-based diffusion coatings is that of case hardening. This process consists of the immersion of a workpiece to be coated in a powder containing the protective material, an inert powder and an activator, then subjecting the whole, in a closed environment, to a heat treatment such as to induce the diffusion of the coating into the surface of the workpiece. This process has several disadvantages, the most important of which is the practical impossibility of coating the internal surfaces of cavities having very narrow access openings, such as the cavities of internally cooled turbine blades.

In addition, it is almost impossible to automate the case hardening process and difficulties arise due to the partial-coating of components of complex shape and wastage of material.

The object of the present invention is to provide a process for coating metals and/or metal alloys which is easy to carry out, of low cost and avoids at least some of the disadvantages referred to above. A further object of the invention is to provide aluminum based coatings on workpieces with greater resistance to high temperatures.

SUMMARY OF THE INVENTION

According to the present invention there is provided a process for forming protective metal diffusion coating on a metal or metal alloy workpiece, including the steps of coating the workpiece with a coating composition comprising a suspension of the protective metal in a carrier liquid, and then heating the coated workpiece in a non-oxidizing environment to effect diffusion of the protective metal into the surface of the workpiece. The protective metal used in the process of the present invention preferably comprises or includes aluminium, but the high temperature properties of the coatings may be improved by the addition of chromium and/or small quantities of rare earth metals.

The use of rare earth metals to improve the properties of the coatings results from the experimental observation that small quantities of such metals improve considerably the resistance of high-temperature alloys to oxidation.

It has been shown, in fact, that yttrium is able to increase the adherence of aluminium oxide layers formed on aluminized alloys of the Fe-Cr or Co-Cr-Al types. The mechanism of this action is not entirely clear but the effect forms the basis of their use in coatings made by the process of the present invention to improve the resistance to scaling of surface layers formed by oxidative and corrosive degradation, with subsequent increase in the life of the coated material.

The invention will now be described in greater detail, by way of example.

The coating composition or "slurry" is preferably prepared by mixing powders of aluminium and chromium, aluminium and yttrium, or aluminium, chromium and cerium in an organic carrier liquid in a non-polluting container.

The metals employed in the coating slurry of the present invention are preferably in the form of powders of grain size of from 0.5 to 10 $\mu$m and are preferably combined with an activating agent, such as an alkali metal or ammonium halide, and possibly also an inert powder such as alumina, a binding or suspending agent, and a diluent. After coating a workpiece with the resulting slurry by immersion or by spraying, diffusion heat treatment is effected in a closed environment at a temperature of between 900° and 1100° C., for periods between 1 and 5 hours depending upon the composition of the substrate material to be coated. In this manner coatings with thicknesses between 40 and 120 $\mu$m can be obtained.

The use of rare earth elements in the process described, and in general for the formation of diffusion coatings, entails the availability of powders of the elements in a form sufficiently fine to ensure good dispersion in the slurry and consequently their homogeneous distribution in the resulting diffusion coating.

Powders of yttrium or cerium with sufficiently fine grain size are not commercially available at the moment and are very difficult to obtain by grinding. One method of overcoming this problem and providing, in each case, powders having controlled characteristics and considerable activity, is to prepare yttrium or cerium hydride from metal shavings, and to grind these to obtain a fine powder of $\phi < 10$ $\mu$m, and to use the ground shavings as such in forming the coating slurry. By using the hydrides, the availability of yttrium and cerium in elemental form is ensured at the treatment temperature.

An example of a process for the preparation of yttrium or cerium hydrides for this purpose is the following: shavings of yttrium or cerium are heat-treated in vacuo (less than $10^{-4}$ Torr) in an oven at a temperature of 600° C. for 1 hour: hydrogen is then admitted (OH content 10 p.p.m.) to bring the pressure in the oven up to atmospheric pressure, the temperature being raised to 750° C. for 2 hours. The yttrium and cerium hydrides thus obtained can easily be ground in an organic solvent to the desired grain size ($\phi = 0.5 \sim 10$ $\mu$m) and have the composition $YH_{2.5}$ and $CeH_{2.3}$ respectively.

DESCRIPTION OF THE PREFERRED EMBODIMENTS

To illustrate the invention further, some examples of its practical application will now be described, such examples being, of course, non-limiting as regards further applications.

EXAMPLE 1

After degreasing with ethylene trichloride in an ultrasonic cleaning machine and sandblasting, various workpieces of nickel-based superalloys (Hastelloy X, Inconel 738 LC, Nimonic 90, Registered Trade Marks) in the form of prismatic test samples each having an internal cavity of diameter 1.5 mm, where chromo-aluminized by the process of the present invention, as follows:

The test samples were first coated by immersion in a suspension or slurry having the following composition by weight:

Chromium (average grain size 2μ) 76%
Aluminium (average grain size 2μ) 4%
Ammonium Chloride (average grain size 5μ) 5%
Cellulose acetate dissolved in acetone in a ratio of 1:4, 15%

In the composition, the ammonium chloride acts as an activating agent, and the cellulose acetate as a suspending agent such that the coating slurry is effectively a lacquer.

The coating was carried out so as to obtain a coating density of 75 mg/cm on the test pieces.

The first coat was followed by a second coat of 25 mg/cm of a different coating slurry having the composition by weight:

Aluminium (average grain size 2μ) 80%
Ammonium chloride (average grain size 5μ) 5%
Cellulose acetate dissolved in acetone in a ratio of 1:4, 15%

The test samples were then dried and finally heated in an inert atmosphere to a temperature of 1000° C. for 3 hours to allow diffusion of metal from the coatings into the surfaces of the test pieces, diffusion layers having a thickness of between 50 and 90μ being obtained.

The quality of the resulting coatings was tested for oxidation, thermal shock and corrosion.

The tests for resistance to oxidation were carried out by exposing the coated test samples to air at a temperature of 1100° C. for 500 hours. The resistance to thermal fatigue was tested by heating the samples in air in cycles ranging from 200° to 1200° C., for 1500 test cycles, and the test for resistance to corrosion was effected by exposing the samples to a flow of combustion gases derived from diesel oil rich in sulphur and doped with vanadium anhydride and sodium chloride at 950° C. for 500 hours.

All the samples passed these tests with a loss of weight of within 2 mg/cm.

EXAMPLE 2

Test samples similar in size, shape and material to those of Example 1, were coated with a layer of 75 mg/cm of a slurry having the following composition by weight:

Chromium (average grain size 2μ) 77%
Aluminium (average grain size 2μ) 4%
Yttrium hydride (average grain size 2μ) 4%
Cellulose acetate dissolved in acetone in a ratio of 1:4, 15%

A second coat of 25 mg/cm of the same composition as the second coat of Example 1 was then applied.

Thermal diffusion treatment was then carried out in an inert atmosphere at a temperature of 1000° C. for 5 hours.

The test samples were subjected to the same tests as those described in Example 1, and weight losses of less than 1 mg/cm were recorded.

EXAMPLE 3

To test the feasibility of coating the internal surfaces of cooling cavities of aeronautical gas turbine blades, as well as small diameter apertures as in Examples 1 and 2, cavities formed by microwelding in turbine blades of Inconel 100 for aeronautical engines were coated by the process of the present invention.

The slurry used to coat the blade had the following composition by weight:

Aluminium (grain size 2μ) 34%
$Al_2O_3$ (grain size 1μ) 47%
Ammonium Chloride (grain size 5μ) 4%
Cellulose acetate dissolved in acetone in a ratio of 1:4, 15%

This slurry was made more fluid by the continual addition of acetone to allow dispersion of the slurry into the blade cavities through holes in the blade roots and the level of slurry in the cavities was continuously restored until a layer of 60 mg/cm was obtained.

The blade thus coated was heat-treated in an inert atmosphere at 1000° C. for 3 hours and, after ultra-sonic cleaning, was subjected to a second heat treatment at 1100° C. for 1 hour.

Metallographic analysis of the resulting diffusion-coated blade revealed a continuous and homogeneous coating across the entire cross-section and along the entire length of the blade cavity.

What is claimed is:

1. A process for forming a protective metal diffusion coating on a metal or metal alloy workpiece, including the steps of:
   preparing a first coating composition comprising a slurry of said protective matal in a carrier liquid, wherein said protective metal comprises aluminum and chromium in combination with yttrium, said chromium and said yttrium being present in an amount effective to improve the high temperature properties of said diffusion coating, said first coating composition comprising 77 wt % chromium, 4 wt % aluminum, 4 wt % yttrium hydride and 15 wt % of a cellulose acetate/acetone solution,
   preparing a second coating composition comprising 80 wt % aluminum, 5 wt % ammonium chloride and 15 wt % of a cellulose acetate/acetone solution,
   coating said workpiece with said first coating composition and then with said second coating composition, and
   heating the coated workpiece in a non-oxidizing environment at 900° to 1100° C. for 1 to 5 hours to effect diffusion of said protective metal into the surface of said workpiece.

2. A process as in claim 1, wherein said protective metal is added to said carrier liquid in the form of a powder having an average grain size of between substantially 0.5μ and 10μ.

3. A process as in claim 1, wherein said coating composition further includes an inert filler.

4. A process as claimed in claim 1, wherein the workpiece is a nickel alloy.

* * * * *